United States Patent
Okamoto et al.

(10) Patent No.: US 11,518,271 B2
(45) Date of Patent: Dec. 6, 2022

(54) CHARGING CONTROL APPARATUS, TRANSPORT DEVICE, AND NON-TEMPORARY COMPUTER-READABLE STORAGE MEDIUM

(71) Applicant: HONDA MOTOR CO., LTD., Tokyo (JP)

(72) Inventors: Yusuke Okamoto, Saitama (JP); Takeshi Fujino, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 77 days.

(21) Appl. No.: 17/105,658

(22) Filed: Nov. 27, 2020

(65) Prior Publication Data
US 2021/0101504 A1 Apr. 8, 2021

Related U.S. Application Data

(63) Continuation of application No. PCT/JP2019/010774, filed on Mar. 15, 2019.

(30) Foreign Application Priority Data

May 31, 2018 (JP) .............................. JP2018-104965

(51) Int. Cl.
*B60L 58/25* (2019.01)
*H02J 7/00* (2006.01)

(52) U.S. Cl.
CPC ............ *B60L 58/25* (2019.02); *H02J 7/0047* (2013.01); *H02J 7/00714* (2020.01); *H02J 7/007194* (2020.01)

(58) Field of Classification Search
None
See application file for complete search history.

(56) References Cited

U.S. PATENT DOCUMENTS

| | | | |
|---|---|---|---|
| 2013/0119939 A1 | 5/2013 | Yonezawa | |
| 2015/0066837 A1* | 3/2015 | Twarog | B60L 58/24 706/58 |
| 2017/0217328 A1* | 8/2017 | Patel | B60K 1/04 |

FOREIGN PATENT DOCUMENTS

| | | |
|---|---|---|
| JP | 2000197212 A | 7/2000 |
| JP | 2008099411 A | 4/2008 |
| JP | 2013106476 A | 5/2013 |

OTHER PUBLICATIONS

ISA/237) Written Opinion of the International Search Authority for International Patent Application No. PCT/JP2019/010774, issued/mailed by the Japan Patent Office dated Jun. 4, 2019.

* cited by examiner

*Primary Examiner* — Robert Grant

(57) ABSTRACT

A charging control apparatus includes: a prediction unit configured to predict a change in temperature of a battery over time during charging; a calculation unit configured to calculate, based on the change in temperature over time predicted by the prediction unit, a degree of influence that the battery receives from the temperature of the battery exceeding a predetermined upper-limit temperature control value; and a charging control unit configured to allow the temperature of the battery to exceed the upper-limit temperature and charge the battery when the degree of influence is less than a predetermined reference value.

9 Claims, 12 Drawing Sheets

| TEMPERATURE / SOC | −10 | 0 | 10 | 20 | ... | 50 |
|---|---|---|---|---|---|---|
| 10 | I11 | I12 | I13 | I14 | ... | I17 |
| 20 | I21 | I22 | I23 | I24 | ... | I27 |
| ⋮ | ⋮ | ⋮ | ⋮ | ⋮ | ⋮ | ⋮ |
| 80 | I81 | I82 | I83 | I84 | ... | I87 |
| 90 | I91 | I92 | I93 | I94 | ... | I97 |

*FIG. 4*

| TEMPERATURE / SOC | -10 | 0 | 10 | 20 | ... | 50 |
|---|---|---|---|---|---|---|
| 10 | R11 | R12 | R13 | R14 | ... | R17 |
| 20 | R21 | R22 | R23 | R24 | ... | R27 |
| ⋮ | ⋮ | ⋮ | ⋮ | ⋮ | ⋱ | ⋮ |
| 80 | R81 | R82 | R83 | R84 | ... | R87 |
| 90 | R91 | R92 | R93 | R94 | ... | R97 |

CHARGING CONTROL APPARATUS, TRANSPORT DEVICE, AND NON-TEMPORARY COMPUTER-READABLE STORAGE MEDIUM

CROSS REFERENCE TO RELATED APPLICATION

The contents of the following Japanese patent application and internal application are incorporated herein by reference, Japanese Patent Application No. 2018-104965 filed on May 31, 2018 and International Application No. PCT/JP2019/010774 filed on Mar. 15, 2019.

BACKGROUND

1. Technical Field

The present invention relates to a charging control apparatus, a transport device, and a non-temporary computer-readable storage medium.

2. Related Art

A technique is known in which a charge current value in accordance with a battery remaining capacity and a battery temperature is instructed to charging means (see, for example, the following patent document 1).

PRIOR ART DOCUMENTS

Patent Documents

Patent document 1: Japanese Unexamined Patent Application Publication No. 2000-197212.

BRIEF DESCRIPTION OF THE DRAWINGS

FIG. 4 illustrates an exemplary charge current map in the form of a table.

FIG. 5 illustrates an exemplary internal resistance map in the form of a table.

DESCRIPTION OF EXEMPLARY EMBODIMENTS

The present invention will now be described using embodiments of the invention. The following embodiments are not to limit the present invention according to the appended claims. All combinations of features described in the embodiments are not necessarily essential to solutions provided by the present invention.

Figure 1:
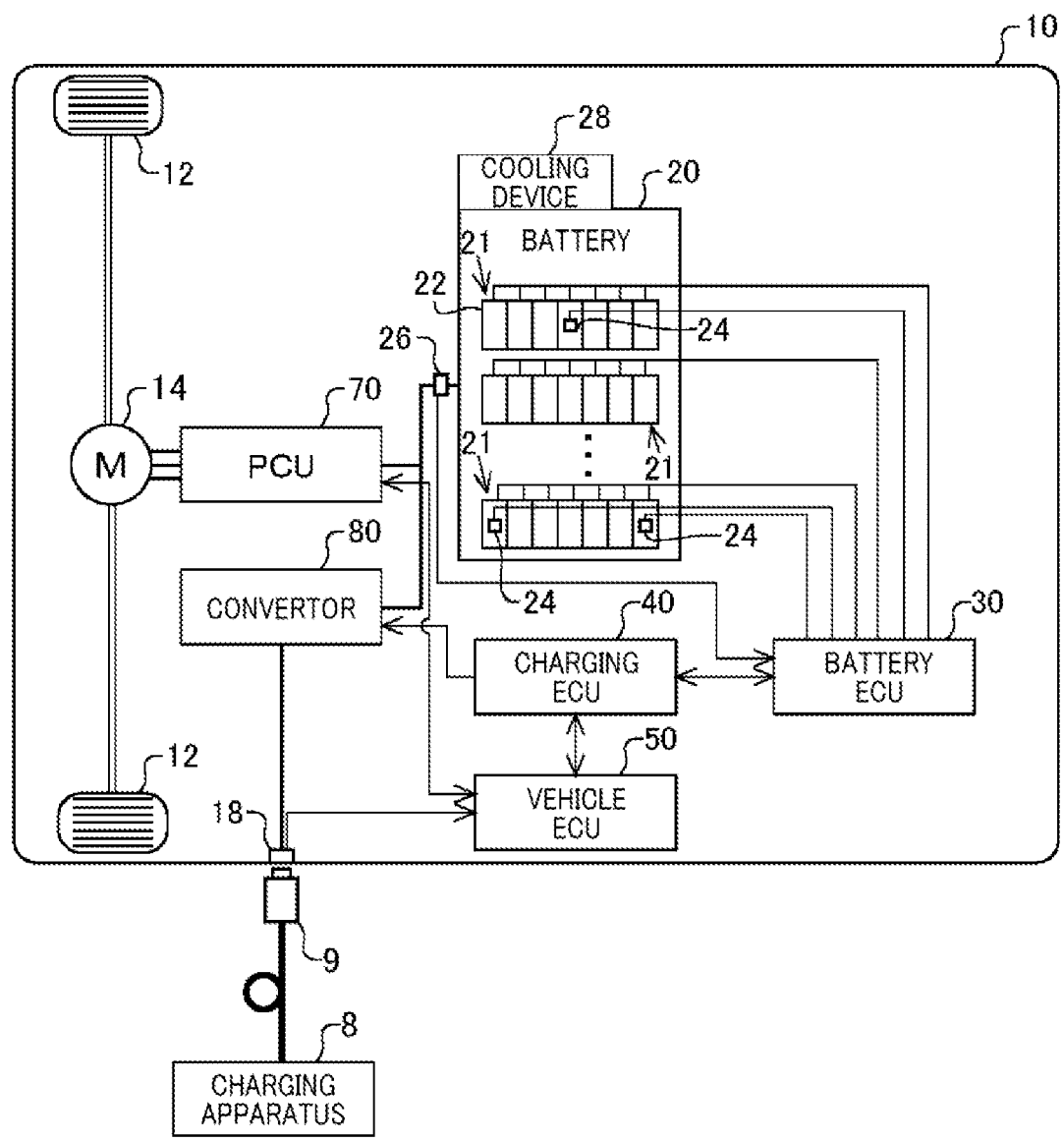
FIG. 1 schematically illustrates a configuration of a charging system 5 according to an embodiment.

FIG. 1 schematically illustrates a configuration of a charging system 5 according to an embodiment. The charging system 5 includes a charging apparatus 8 and a vehicle 10. The vehicle 10 is an exemplary transport device. The vehicle 10 is, for example, an electric vehicle. The electric vehicle includes a battery electric vehicle (BEV) and a plug-in hybrid electric vehicle (PHEV). The vehicle 10 may be a hybrid automobile including an internal combustion engine configured to provide at least part of motive power.

The vehicle 10 includes drive wheels 12, a motor unit 14, a battery 20, a battery ECU 30, a cooling device 28, a charging ECU 40, a vehicle ECU 50, a PCU 70, and a convertor 80. "ECU" is an abbreviation for electronic control unit. "PCU" is an abbreviation for power control unit.

The battery 20 accumulates electric energy. The electric energy accumulated in the battery 20 is supplied as DC power to the PCU 70. The PCU 70 converts the DC power from the battery 20 into AC power and supplies the AC power to the motor unit 14. The motor unit 14 outputs motive power using the AC power supplied from the battery 20. The motive power from the motor unit 14 is transmitted to the drive wheels 12. Moreover, the motor unit 14 converts kinetic energy of the vehicle 10 transmitted via the drive wheels 12, for example, into electric energy and generates regenerative power. The PCU 70 converts the generated regenerative power into DC power and accumulates the DC power in the battery 20.

The convertor 80 converts, into DC power, AC power supplied from the charging apparatus 8 via a power receiver 18 of the vehicle 10, and supplies the DC power to the battery 20. The battery 20 is provided with a current sensor 26. The current sensor 26 detects a current supplied to the battery 20. The current sensor 26 detects power supplied from the convertor 80 to the battery 20. Also, the current sensor 26 detects a current supplied from the battery 20 to the PCU 70. A signal indicative of a current value detected by the current sensor 26 is supplied to the battery ECU 30.

The battery 20 includes a plurality of battery packs 21 connected in series, and a plurality of temperature sensors 24 including a temperature sensor 24a, a temperature sensor 24b, and a temperature sensor 24c. The battery packs 21 each include a plurality of cells 22 connected in series. The cells 22 may be lithium-ion cells, nickel-metal hydride cells or the like. The temperature sensors 24 detect temperatures inside of the battery 20. In order to detect a temperature at a high-temperature portion and a temperature at a low-temperature portion inside of the battery 20, the temperature sensors 24 are provided at a plurality of positions inside of the battery 20. Signals indicative of the temperatures detected by the temperature sensors 24 are supplied to the battery ECU 30. The cooling device 28 cools the battery 20.

The cooling device 28 supplies a cooling medium such as air to the battery 20 to cool the battery 20.

The battery 20 supplies the battery ECU 30 with a signal indicative of a cell voltage of each of the plurality of cells 22 that is detected by a voltage sensor. For example, when the battery 20 includes M cells 22 ("M" is the number of the cells 22), the battery 20 supplies the battery ECU 30 with signals indicative of M cell voltages. The cell voltages are each measured as a voltage between a cathode and an anode.

The battery ECU 30 monitors a state of the battery 20 and outputs various kinds of signals. For example, the battery ECU 30 calculates various quantities of state, such as an SOC and an internal resistance, of each of the cells 22, based on various kinds of signals, such as the cell voltage signals supplied from the battery 20, the current signal supplied from the current sensor 26, and the temperature signals supplied from the temperature sensors 24. "SOC" is an abbreviation for state of charge. The battery ECU 30 supplies the calculated various quantities of state to the vehicle ECU 50 and the charging ECU 40.

The vehicle ECU 50 controls the PCU 70 based on information supplied from the charging ECU 40, the battery ECU 30, and the PCU 70. When the vehicle ECU 50 detects that a charging connector 9 of the charging apparatus 8 has been inserted into the power receiver 18, the vehicle ECU 50 acquires identification information of the charging apparatus 8 from the charging apparatus 8. When the charging apparatus 8 is capable of charging the battery 20, the vehicle ECU 50 supplies the charging ECU 40 with charging allowance information indicative of the charging apparatus 8 being capable of charging, and a desired value of the SOC. Based on the information supplied from the battery ECU 30 and the vehicle ECU 50, the charging ECU 40 controls the convertor 80 to charge the battery 20.

The battery ECU 30 determines a charge current in accordance with a charge current map and supplies the charge current to the charging ECU 40. In the charge current map, temperatures of the battery 20 and SOCs of the battery 20 are mapped with respect to charge currents. When the charging ECU 40 starts charging the battery 20, the charging ECU 40 follows the charge current map where temperatures of the battery 20 and SOCs of the battery 20 are mapped with respect to charge currents so as to charge the battery 20.

An upper-limit temperature control value is determined for the battery 20. The upper-limit temperature control value is an upper limit value of temperature at which the battery 20 can continuously operate. The upper-limit temperature control value is, for example, a temperature that can minimize an influence on degradation of the battery 20 even when the battery 20 is kept operating at the upper-limit temperature control value. The battery ECU 30 predicts a change in temperature of the battery 20 over time in the case of continuously charging the battery 20 in accordance with the charge current map during rapid charging of the battery 20. Even when it is predicted from the predicted change over time that the temperature of the battery 20 is to exceed the upper-limit temperature control value, the battery ECU 30 allows exceeding the upper-limit temperature control value and sets a charge current in the case where a degree of influence that the battery 20 receives from the temperature while the battery 20 exceeds the upper-limit temperature control value is less than a reference value. The charging ECU 40 charges the battery 20 with the charge current set by the battery ECU 30. The charging ECU 40 charges the battery 20 within a charge current range that the charging apparatus 8 is capable of supplying.

Specifically, during rapid charging of the battery 20, the battery ECU 30 calculates, based on a present SOC and temperature of the battery 20 and the charge current map, an amount of heat generated by the battery 20 in the case of charging the battery 20 with the charge current determined in accordance with the charge current map until the SOC reaches its target value. The battery ECU 30 predicts a future change in temperature of the battery 20 over time, based on the calculated amount of generated heat, an amount of heat cooled by the cooling device 28, and a heat capacity of the battery 20. Based on the predicted change in temperature of the battery 20 over time and a degree of influence that the battery 20 receives from each temperature per unit time, the battery ECU 30 predicts a degree of influence that the battery 20 receives while the temperature of the battery 20 exceeds the upper-limit temperature control value. The degree of influence is calculated by, for example, time integration of a predetermined function with a value dependent on temperature.

Even when the temperature of the battery 20 temporarily exceeds the upper-limit temperature control value, a temperature difference of the battery 20 can be reduced relatively early due to a heat gradient in the cells 22. Consequently, an influence that the battery 20 receives when the temperature of the battery 20 temporarily exceeds the upper-limit temperature control value can be different from an influence that the battery 20 receives when the battery 20 is continuously subjected to the upper-limit temperature control value.

Under control by the battery ECU 30, appropriate evaluation is made on the predicted temperature of the battery 20 in a process of charging and the degree of influence that the battery 20 receives while the temperature of the battery 20 exceeds the upper-limit temperature control value. When the degree of influence is less than the reference value, the temperature of the battery 20 is allowed to exceed the upper-limit temperature control value, and the charge current is set. Thus, while the battery 20 is prevented from being influenced, for example, being degraded by the temperature, more energy can be accumulated in the battery 20 in a shorter time.

Figure 2:
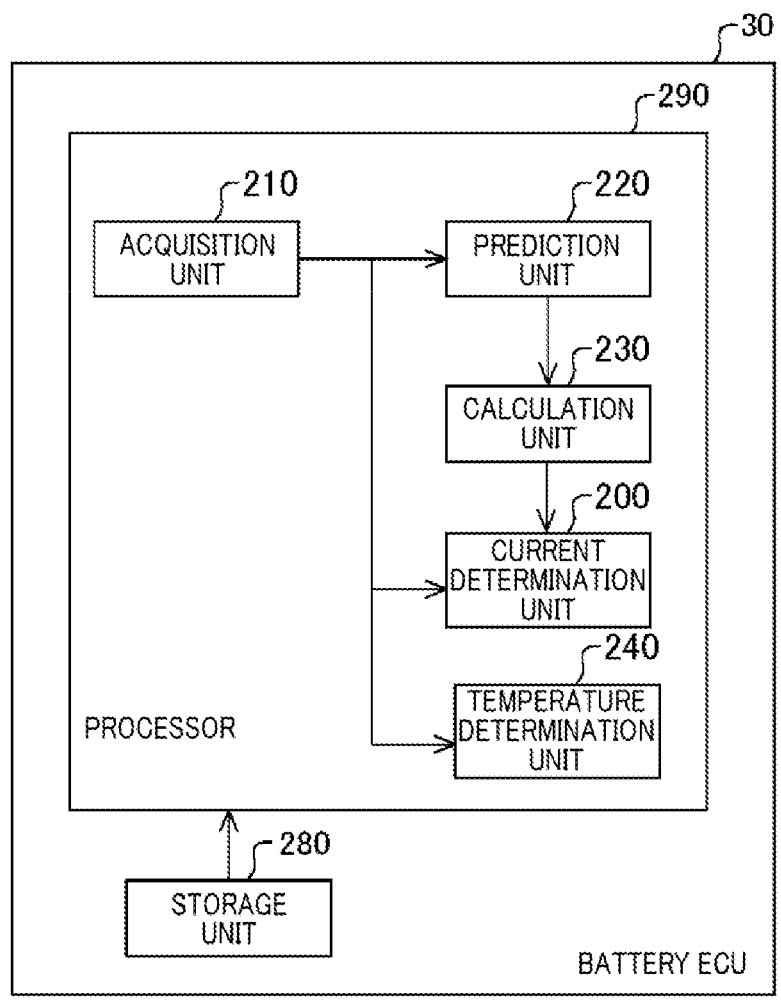
FIG. 2 schematically illustrates a function configuration of a battery ECU 30.

FIG. 2 schematically illustrates a function configuration of the battery ECU 30. The battery ECU 30 includes a processor 290 and a storage unit 280. The processor 290 includes an acquisition unit 210, a prediction unit 220, a calculation unit 230, a current determination unit 200, and a temperature determination unit 240.

The processor 290 may be a processing device such as a microprocessor. The battery ECU 30 is a kind of computer. The storage unit 280 has stored therein information required for operating the battery ECU 30. The storage unit 280 has stored therein control programs of the battery ECU 30, constants and variables used by the control programs, and temporary information required for calculation in the control programs.

The acquisition unit 210 acquires information supplied from the battery 20 and information supplied from the charging ECU 40. The acquisition unit 210 acquires information indicative of voltage and temperature of the battery 20 from the battery 20. The storage unit 280 has stored therein the charge current map configured to prescribe the charge current using the temperature and SOC of the battery 20 as indices.

The prediction unit 220 predicts a change in temperature of the battery 20 over time during charging. For example, the prediction unit 220 predicts, based on the charge current map and the present SOC and temperature acquired by the acquisition unit 210, a change in temperature of the battery 20 over time in the case of stopping charging of the battery 20 when the charge rate of the battery 20 reaches its target charge rate, considering an amount of heat generated by the battery 20 and a charge rate of the battery 20 that are predicted in the case of charging the battery 20 with a charge current prescribed by the charge current map and considering the amount of heat of the battery 20 cooled per unit time by the cooling device 28.

The calculation unit 230 calculates, based on the change in temperature over time predicted by the prediction unit 220, a degree of influence that the battery 20 receives from the temperature of the battery 20 exceeding the predetermined upper-limit temperature control value. For example, the calculation unit 230 uses the following formula to calculate the degree of influence that the battery 20 receives from the temperature of the battery 20 exceeding the upper-limit temperature control value.

Formula 1

In the formula 1, "T" represents the temperature of the battery 20, and "T1" represents the upper-limit temperature control value. "t1" represents time when the temperature of the battery 20 has reached T1, and "t2" represents time when the temperature of the battery 20 has decreased to T1.

When the degree of influence calculated by the calculation unit 230 is less than the predetermined reference value, the current determination unit 200 determines a charge current with which the temperature of the battery 20 is allowed to exceed the upper-limit temperature control value and the battery 20 can be charged, and supplies the charging ECU 40 with information indicative of the determined charge current. Thus, even when a temperature of some of the cells 22 in the battery 20 temporarily exceeds the upper-limit temperature control value, charging can be performed by appropriately evaluating an influence that the battery 20 receives by temporarily exceeding the upper-limit temperature control value. Consequently, while durability degradation of the battery 20, for example, is minimized, charging can be prevented from being ended by reaching the upper-limit temperature control value during high-rate rapid charging. Moreover, restriction by the upper-limit temperature control value is relieved in a limited manner so that high-rate charging time can be lengthened to shorten charging time of rapid charging. This makes it possible to shorten time until charging of the battery 20 is completed.

When the degree of influence calculated by the calculation unit 230 does not exceed the predetermined reference value, the current determination unit 200 restricts a charge amount of the battery 20 so that the predicted temperature of the battery 20 is not to exceed a predetermined protection temperature. For example, the current determination unit 200 restricts the charge current so that the predicted temperature of the battery 20 is not to exceed the predetermined protection temperature higher than the upper-limit temperature control value. For example, the prediction unit 220 predicts, concerning each of the plurality of charge currents, a change in temperature of the battery 20 over time in the case of charging the battery 20 with each of the charge currents. Then, the current determination unit 200 specifies charge currents from among the plurality of charge currents at which a maximum temperature in the change in temperature over time predicted by the prediction unit 220 is not to exceed the predetermined protection temperature, and the current determination unit 200 determines a maximum charge current from among the specified charge currents as a charge current of the battery 20. Information indicative of the charge current determined by the current determination unit 200 is supplied to the charging ECU 40 and used for charging control of the battery 20. This makes it possible to further shorten the time until charging of the battery 20 is completed.

The prediction unit 220 predicts, concerning each of the plurality of charge currents, a change in temperature of the battery 20 over time in the case of stopping charging of the battery 20 when the charge rate of the battery 20 reaches the target charge rate, considering an amount of heat generated by the battery 20 and a charge rate of the battery 20 that are predicted in the case of charging the battery 20 with each of the charge currents and considering the amount of heat of the battery 20 cooled per unit time. An SOC may be applied as the charge rate. The prediction unit 220 may predict the amount of generated heat, concerning each of the plurality of charge currents, considering an internal resistance in accordance with a temperature of the battery 20 that is predicted in the case of charging the battery 20 with each of the charge currents. This makes it possible to predict the temperature of the battery 20 more accurately.

It is noted that the protection temperature is set at a temperature higher than the upper-limit temperature control value so as to prevent loss of functions of the battery 20 and occurrence of a hazardous event. The battery 20 is inhibited from operating when the temperature of the battery 20 exceeds the protection temperature. The temperature determination unit 240 determines, as a stop temperature at which to stop charging of the battery 20, a maximum temperature in the change in temperature of the battery 20 over time that is predicted in the case of charging the battery 20 with the maximum charge current, and the temperature determination unit 240 supplies the maximum temperature to the charging ECU 40. Thus, in the case of exceeding the maximum temperature, charging of the battery 20 is stopped so that loss of functions of the battery 20 and occurrence of a hazardous event can be prevented.

It is noted that the calculation unit 230 desirably calculates the degree of influence caused by the temperature of the battery 20 exceeding the upper limit, when the charge rate of the battery 20 is equal to or higher than 50% of the target value of the charge rate. Since prediction accuracy of the temperature change over time is higher in a high SOC in some degree than in a low SOC after a start of charging, calculation accuracy of the degree of influence is also enhanced. The calculation unit 230 calculates the degree of influence, when the SOC is equal to or higher than 50% of the target SOC, so that it is possible to more reliably shorten the time until charging of the battery 20 is completed.

Figure 3:
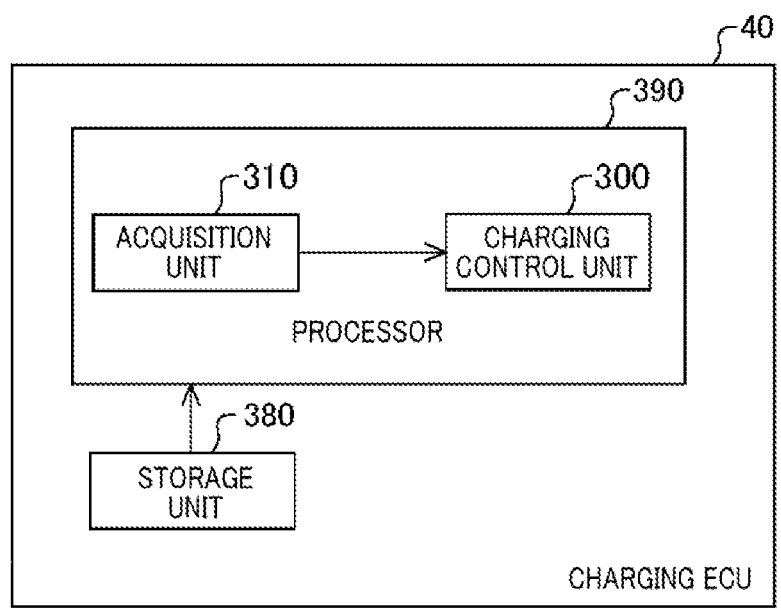
FIG. 3 schematically illustrates a function configuration of a charging ECU 40.

FIG. 3 schematically illustrates a function configuration of the charging ECU 40. The charging ECU 40 includes a processor 390 and a storage unit 380. The processor 390 includes an acquisition unit 310 and a charging control unit 300.

The processor 390 may be a processing device such as a microprocessor. The charging ECU 40 is a kind of computer. The storage unit 380 has stored therein information required for operating the charging ECU 40. The storage unit 380 has stored therein control programs of the charging ECU 40, constants and variables used by the control programs, and temporary information required for calculation in the control programs.

The acquisition unit 310 acquires information supplied from the battery ECU 30, information supplied from the vehicle ECU 50, and information supplied from the convertor 80. The acquisition unit 310 acquires, from the battery ECU 30, information indicative of a voltage, an SOC, a temperature, an internal resistance, and a charge current of the battery 20. The acquisition unit 310 also acquires the charging allowance information and information indicative of the desired value of the SOC that are supplied from the vehicle ECU 50. When the charging connector 9 is connected to the power receiver 18 and when the vehicle ECU 50 determines, from the identification information acquired from the charging apparatus 8, that the charging apparatus 8 is capable of charging the vehicle 10, the vehicle ECU 50 supplies the charging ECU 40 with the charging allowance information and the information indicative of the desired value of the SOC.

The charging control unit 300 controls charging of the battery 20. For example, the charging control unit 300 controls rapid charging of the battery 20. The charging control unit 300 controls the convertor 80 to control power supplied from the charging apparatus 8 to the battery 20. The charging control unit 300 controls the convertor 80 to make a current supplied from the convertor 80 to the battery 20 coincide with the charge current supplied from the battery ECU 30. Thus, the charging control unit 300 charges the battery 20 with the charge current prescribed in accordance with the charge current map based on the present temperature and SOC of the battery 20.

The charging control unit 300 charges the battery 20 in accordance with information indicative of the charge current and the stop temperature that is supplied from the battery ECU 30. Thus, when the degree of influence calculated by the calculation unit 230 of the battery ECU 30 is less than the predetermined reference value, the charging control unit 300 can allow the temperature of the battery 20 to exceed the upper-limit temperature control value and can charge the battery 20. When the degree of influence calculated by the calculation unit 230 does not exceed the predetermined reference value, the charging control unit 300 can restricts a charge amount of the battery 20 so that the temperature of the battery 20 is not to exceed the protection temperature. This makes it possible to shorten time until charging of the battery 20 is completed. Moreover, the charging control unit 300 can charge the battery 20 with the maximum charge current from among the charge currents at which a maximum value of the temperature of the battery 20 that is predicted by the prediction unit 220 of the battery ECU 30 is not to exceed the predetermined protection temperature. This makes it possible to shorten time until charging of the battery 20 is completed while protecting the battery 20.

It is noted that when the temperature of the battery 20 reaches the stop temperature supplied from the battery ECU 30, the charging control unit 300 stops charging the battery 20. This makes it possible to shorten time until charging of the battery 20 is completed while operating the battery 20 safely.

As described above, when the degree of influence that the battery 20 receives from exceeding the predetermined upper-limit temperature control value is predicted to be low, the battery ECU 30 and the charging ECU 40 allow the battery 20 to exceed the upper-limit temperature control value and be charged so that more energy can be accumulated in a shorter time while degradation of the battery 20 is minimized. Furthermore, it is possible to prevent stopping charging of the battery 20 in an insufficient state of charge.

FIG. 4 illustrates an example of the charge current map in the form of a table. With reference to the charge current map, each charge current I is determined by a given combination of an SOC and a temperature. The charge current map indicates a maximum value of current allowed to be continuously supplied to the battery 20 when the combination of the SOC and the temperature of the battery 20 falls within an SOC and temperature range illustrated in the charge current map.

The current determination unit 200 refers to the charge current map and determines the charge current I from the temperature and the SOC of the battery 20. For example, the current determination unit 200 determines 183 as the charge current, according to the charge current map illustrated in FIG. 3, when the temperature of the battery 20 is equal to or higher than 10° C. and less than 20° C. and when the SOC is equal to or higher than 80% and less than 90%. Thus, the charging control unit 300 performs constant-current charging of the battery 20 with the charge current I determined according to the charge current map.

It is noted that as the temperature of the battery 20 used to determine the charge current from the charge current map, the current determination unit 200 may use a maximum value Ta from among temperatures detected by the temperature sensors 24. Concerning each of the plurality of cells 22, the current determination unit 200 may determine the charge current I from an SOC and Ta combination of each of the cells 22 in the charge current map. In this case, the current determination unit 200 may determine, as the charge current of the battery 20, a minimum current value from among the charge currents I determined from the SOC and Ta combinations corresponding to the plurality of cells 22.

FIG. 5 illustrates an exemplary internal resistance map in the form of a table. With reference to the internal resistance map, each internal resistance R is determined by a given combination of an SOC and a temperature. The internal resistance map illustrates internal resistances of the battery 20 that are predicted when the combination of the SOC and temperature of the battery 20 falls within an SOC and temperature range illustrated in the internal resistance map.

In predicting a change in temperature of the battery 20 over time, the prediction unit 220 refers to the internal resistance map and specifies the internal resistance R determined from the temperature and the SOC of the battery 20. For example, the prediction unit 220 determines R83 as the internal resistance, according to the internal resistance map illustrated in FIG. 5, when the temperature of the battery 20 is equal to or higher than 10° C. and less than 20° C. and when the SOC is equal to or higher than 80% and less than 90%. The prediction unit 220 predicts an amount of heat generated by the battery 20 during charging, considering the determined internal resistance.

It is noted that as the temperature of the battery 20 used to determine the internal resistance from the internal resistance map, the prediction unit 220 may use a minimum value Tb from among temperatures detected by the temperature sensors 24. Generally, an internal resistance is higher at a lower temperature. Therefore, an amount of generated heat during constant-current charging increases at a lower temperature. In view of this, the minimum value Tb from among the temperatures detected by the temperature sensors 24 is used to determine the internal resistance so as not to underestimate the amount of generated heat.

It is noted that the prediction unit 220 may specify, concerning each of the plurality of cells 22, the internal resistance determined from an SOC and temperature Tb combination of each of the cells 22 in the internal resistance map. In this case, the prediction unit 220 may predict an amount of heat generated by the battery 20 during charging, considering a combined resistance of internal resistances determined from corresponding SOCs and temperatures Tb of the plurality of cells 22 and considering the charge current of the battery 20.

It is noted that actual measured values of cell voltage, current, SOC, and temperature are supplied from the battery 20. Based on the cell voltage and the current that are supplied from the battery 20, internal resistances of the cells 22 and an internal resistance of the whole battery 20 can be calculated. Therefore, an internal resistance value determined according to the internal resistance map may be corrected as needed based on the internal resistance calculated from the cell voltage and the current that are actually measured.

Figure 6:
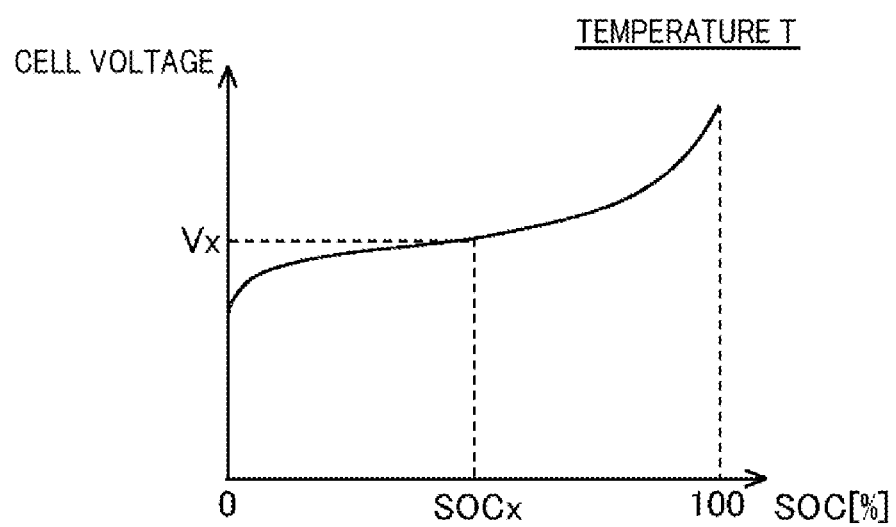
FIG. 6 schematically illustrates an SOC-to-voltage chart indicative of a corresponding relationship between an OCV and a cell voltage.

FIG. 6 schematically illustrates an SOC-to-voltage chart indicative of a corresponding relationship between an OCV and a cell voltage. The battery ECU 30 and the charging ECU 40 have stored therein the SOC-to-voltage chart that correlates the cell voltage with the SOC. The battery ECU 30 supplies the charging ECU 40 with an SOC of each of the cells 22 that is calculated from a cell voltage of each of the cells 22. For example, the battery ECU 30 calculates, as the SOC of the cell 22, SOCx determined from a cell voltage Vx of the cell 22 and the SOC-to-voltage chart. The battery ECU 30 and the charging ECU 40 have stored therein an SOC map corresponding to each temperature. Thus, the battery ECU 30 and the charging ECU 40 refer to the SOC-to-voltage chart corresponding to the temperature of the battery 20 detected by the temperature sensors 24 and calculates the SOC from the cell voltage.

Figure 7:
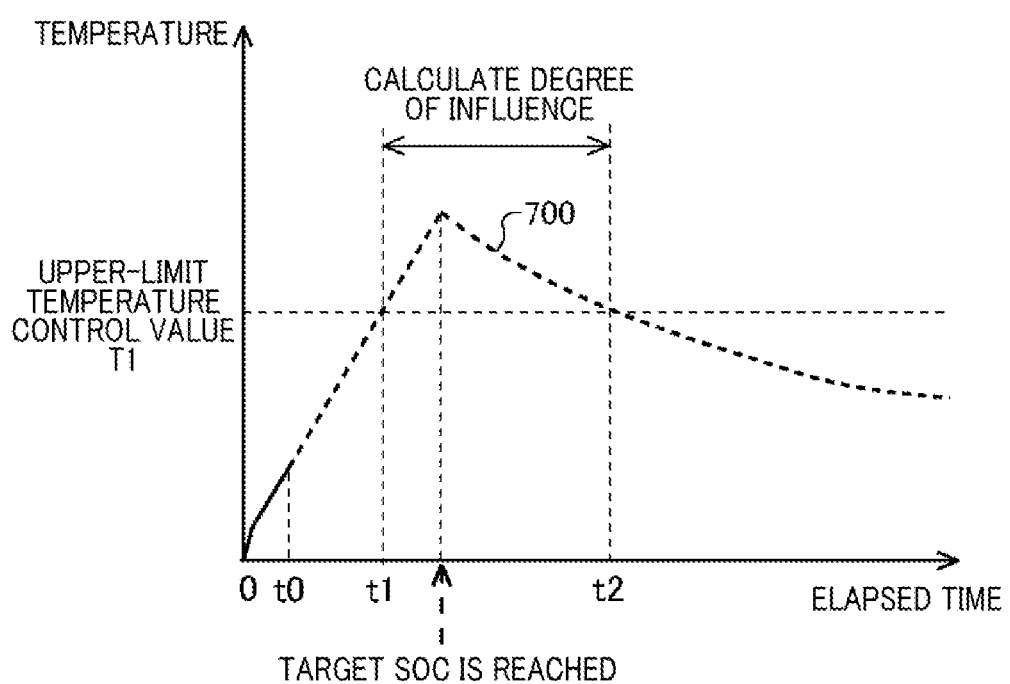
FIG. 7 schematically illustrates a change in temperature over time and a degree of temperature influence that are predicted in a battery 20.

FIG. 7 schematically illustrates the change in temperature over time and the degree of temperature influence that are predicted in the battery 20. In FIG. 7, the horizontal axis represents elapsed time from a start of charging. The vertical axis represents the temperature of the battery 20.

Time t0 indicates time when the SOC of the battery 20 reaches 50% of the target SOC. The prediction unit 220 sets an SOC, a temperature T, an internal resistance R, and a charge current I of the battery 20 at the time t0 as initial values, and calculates the SOC, temperature, internal resistance, and charge current of the battery 20 in every time step $\Delta t$.

For example, the prediction unit 220 calculates an SOC at time t0+$\Delta t$, based on an amount of power accumulated by supplying the charge current I from the time t0 to the time t0+$\Delta t$, the capacity of the battery 20, and the SOC at the time t0. The prediction unit 220 also calculates an amount of heat generated by the battery 20 in the case of supplying the charge current I from the time t0 to the time t0+$\Delta t$ based on the internal resistance R and the charge current I. It is noted that the prediction unit 220 may calculate the amount of heat generated by the battery 20 based on the amount of power supplied from the time t0 to the time t0+$\Delta t$ and further considering an amount of generated heat or an amount of absorbed heat as a result of cell reaction of the battery 20. Moreover, the prediction unit 220 calculates an amount of heat removed from the battery 20 from the time t0 to the time t0+$\Delta t$ from an amount of heat cooled per unit time by the cooling device 28 and due to natural heat radiation.

The prediction unit 220 calculates a temperature of the battery 20 at the time t0+$\Delta t$ based on the amount of heat generated by the battery 20 from the time t0 to the time t0+$\Delta t$, the amount of heat removed from the battery 20, the heat capacity of the battery 20, and the temperature T at the time t0. The prediction unit 220 also calculates an internal resistance and a charge current at the time t0+$\Delta t$ based on the temperature and SOC of the battery 20 at the time t0+$\Delta t$ and with reference to the internal resistance map and the charge current map.

The prediction unit 220 repeats similar calculations to predict changes over time in temperature and SOC of the battery 20 during charging. The prediction unit 220 predicts a change in temperature of the battery 20 over time after the SOC reaches the target SOC by performing calculation while assuming that an amount of generated heat by charging the battery 20 is 0. A line 700 depicts the change in temperature over time predicted by the prediction unit 220.

As illustrated in FIG. 7, when a maximum temperature in the change in temperature over time predicted by the prediction unit 220 exceeds the upper-limit temperature control value T1, the calculation unit 230 calculates a degree of influence that the battery 20 receives from exceeding the upper-limit temperature control value T1. Specifically, the calculation unit 230 calculates the degree of influence according to the above formula 1. The formula 1 is determined considering that as the temperature increases, the influence on the battery 20 increases. According to the above formula 1, the higher temperature the battery 20 is subjected to, the higher degree of influence is calculated. Moreover, according to the above formula 1, the longer the battery 20 exceeds the upper-limit temperature control value T1, the higher degree of influence is calculated. As described above, the temperatures of the battery 20 detected by the temperature sensors 24 are local temperatures inside of the battery 20. Therefore, even when some of the cells 22 in the battery 20 exceed the upper-limit temperature control value T1, a maximum temperature of the battery after charging is completed can be quickly decreased to the upper-limit temperature control value T1 or less due to a heat gradient from the rest of the large number of cells 22 that constitute the battery 20.

Figure 8:
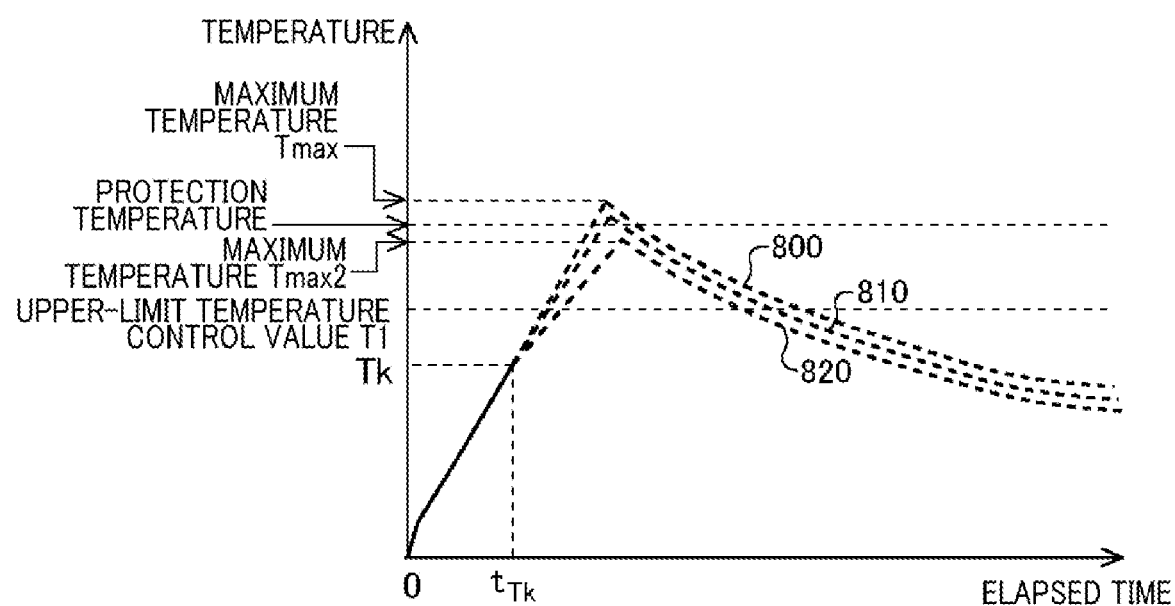
FIG. 8 schematically illustrates a charging method in the case of allowing the battery 20 to exceed an upper-limit temperature control value T1 and be charged.

When the degree of influence calculated by the calculation unit 230 is equal to or higher than the reference value, the temperature determination unit 240 sets the upper-limit temperature control value T1 as the stop temperature at which to stop charging the battery 20. When the degree of influence calculated by the calculation unit 230 is less than the reference value, the temperature determination unit 240 determines a temperature higher than the upper-limit temperature control value T1 as the stop temperature so as to allow the battery 20 to exceed the upper-limit temperature control value T1 and be charged. Referring to FIG. 8, for example, description will be made on a specific example of the control when the degree of influence calculated by the calculation unit 230 is less than the reference value.

It is noted that the reference value of the degree of influence may be predetermined by a test using a battery of the same type as the battery 20. For example, a plurality of unused batteries of the same type as the battery 20 are provided to charge each of the batteries while varying combinations of time of charging the battery over the upper-limit temperature control value T1 and temperatures over the upper-limit temperature control value T1. Based on the formula 1, degrees of influence on the batteries are set. Thereafter, a charge and discharge cycle test of each of the batteries is performed to acquire a performance index such as a capacity maintenance rate so as to specify a battery with the performance index lower than a threshold and determine the reference value based on the degree of influence on the battery with the lower performance index.

FIG. 8 schematically illustrates a charging method in the case of allowing the temperature of the battery 20 to exceed the upper-limit temperature control value T1 and charging the battery 20. At time $t_{Tk}$ when a difference between the upper-limit temperature control value T1 and the temperature of the battery 20 becomes a predetermined temperature difference, the prediction unit 220 predicts again a future change in temperature of the battery 20 over time in the case of charging in accordance with the charge current map. A line 800 depicts the change in temperature over time predicted by the prediction unit 220. When a maximum temperature Tmax predicted in the change in temperature over time predicted by the prediction unit 220 exceeds the protection temperature or when the degree of influence calculated according to the formula 1 is equal to or higher than the reference value, the charge current is restricted to hinder the maximum temperature from exceeding the protection temperature.

Specifically, the prediction unit 220 sets a plurality of charge currents with restricted current values and predicts a change in temperature over time from the time $t_{Tk}$ concerning each of the charge currents. A line 810 depicts a change in temperature over time calculated concerning a first charge current. A line 820 depicts a change in temperature over time calculated concerning a second charge current. A maximum temperature in the change over time depicted by the line 810 exceeds the protection temperature. Meanwhile, a maximum temperature Tmax2 in the change over time depicted by the line 820 does not exceed the protection temperature, and the degree of influence calculated according to the formula 1 is lower than the reference value. In view of this, the current determination unit 200 determines the second charge current as a charge current of the battery 20 and supplies the second charge current to the charging ECU 40. Thus, the charging control unit 300 charges the battery 20 with the second charge current at and after the time $t_{Tk}$. The temperature determination unit 240 sets Tmax2 as the stop temperature at which to stop charging the battery 20. Consequently, even when the charging control unit 300 allows the upper-limit temperature control value T1 and charges the battery 20, the charging control unit 300 can charge the battery 20 so as not to exceed the protection temperature. This makes it possible to reliably protect the battery 20.

When the maximum temperature in the change in temperature over time predicted in the case of charging in accordance with the charge current map at the time $t_{Tk}$ does not exceed the protection temperature and when the degree of influence calculated according to the formula 1 is lower than the reference value, the temperature determination unit 240 determines the maximum temperature as the stop temperature at which to stop charging the battery 20 and supplies the maximum temperature to the charging ECU 40.

It is noted that restriction of the charge current may be implemented by providing a different charge current map configured to restrict the charge current in addition to the charge current map illustrated in FIG. 4, and determining the charge current in accordance with the different charge current map. Alternatively, restriction of the charge current may be implemented by applying a charge current acquired by multiplying the charge current prescribed by the charge current map illustrated in FIG. 4 by a predetermined safety coefficient. Alternatively, restriction of the charge current may be implemented by applying a charge current of a predetermined constant current value.

Referring to FIG. 8, the time $t_{Tk}$ may be time when a temperature difference from the upper-limit temperature control value T1 becomes 10° C. As the temperature difference for prescribing the timing to predict the change in temperature over time again, a value other than 10° C. may be applied. Since the change in temperature over time is predicted at the stage when the difference from the upper-limit temperature control value T1 becomes the predetermined temperature difference, it is possible to acquire the change over time with higher accuracy than the change over time predicted at the time tin FIG. 7.

Figure 9:
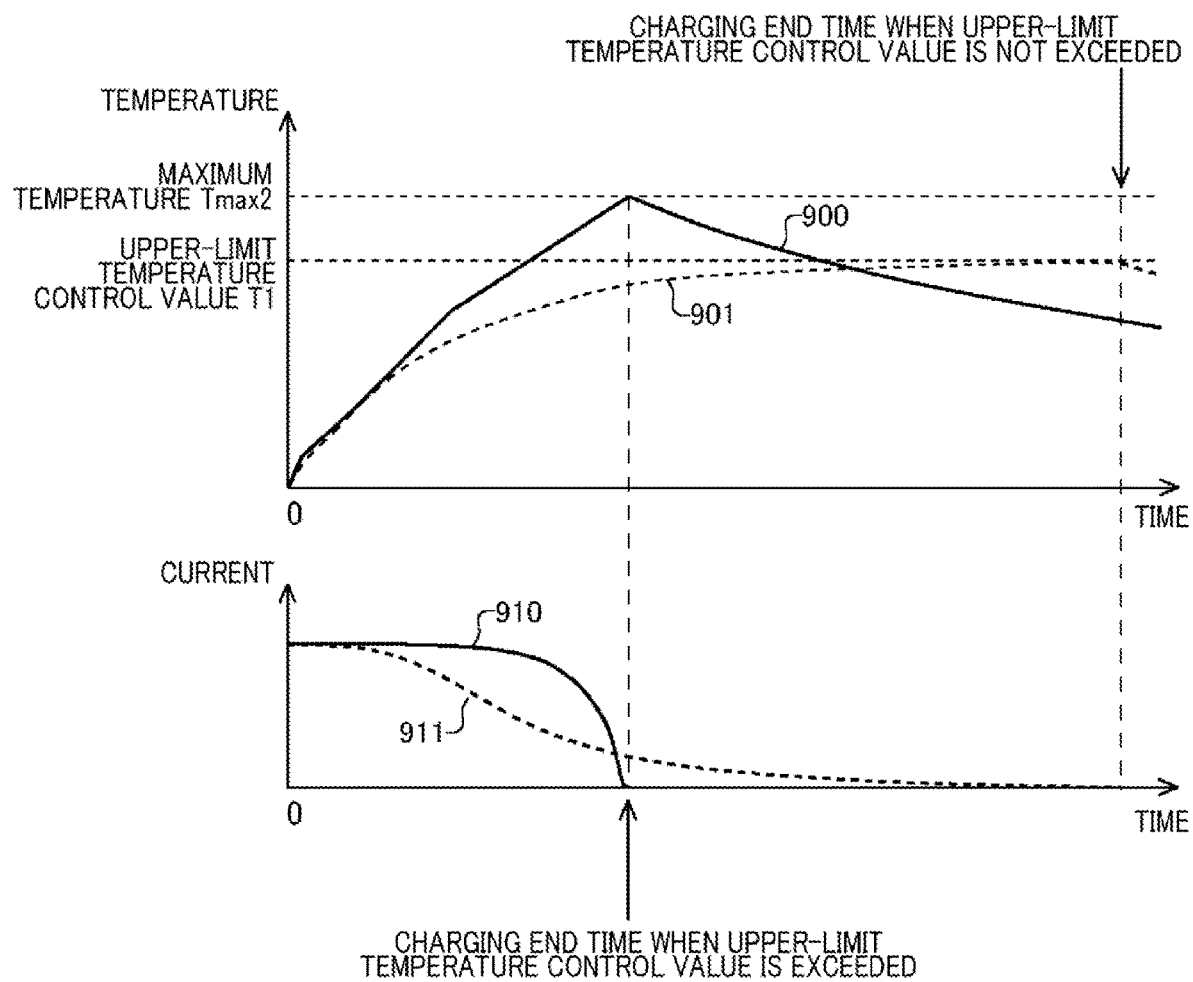
FIG. 9 is graphs schematically illustrating changes in temperature and current over time in the case of allowing charging over the upper-limit temperature control value T1 and in the case of charging not to exceed the upper-limit temperature control value T1.

FIG. 9 is graphs schematically illustrating changes in temperature and current over time in the case of allowing charging over the upper-limit temperature control value T1 and in the case of charging not to exceed the upper-limit temperature control value T1. A line 900 depicts the change in temperature over time in the case of allowing charging over the upper-limit temperature control value T1, and a line 901 depicts the change in temperature over time in the case of charging not to exceed the upper-limit temperature control value T1.

A line 910 depicts the change in current over time in the case of allowing charging over the upper-limit temperature control value T1, and a line 911 depicts the change in current over time in the case of charging not to exceed the upper-limit temperature control value T1. In order not to exceed the upper-limit temperature control value T1, there is need to stepwise lower the charge current as the temperature of the battery becomes closer to the upper-limit temperature control value T1. This lengthens time until the SOC of the battery reaches the target SOC. In contrast, under the control of the battery ECU 30 and the charging ECU 40, charging the battery 20 over the upper-limit temperature control value T1 is allowed so that time of charging the battery 20 can be increased at a relatively high rate. This makes it possible to shorten time until the target SOC is reached.

Figure 10:
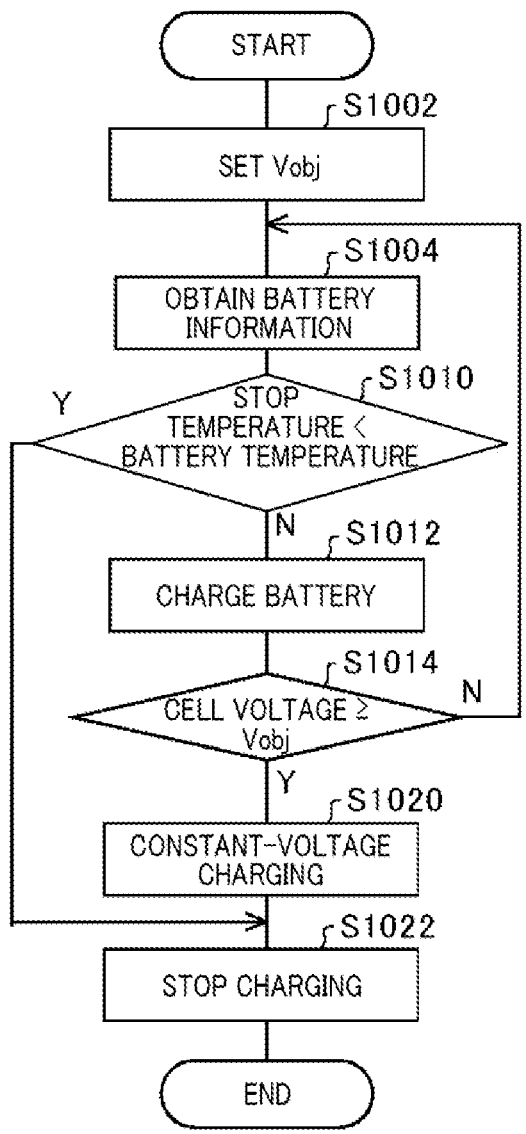
FIG. 10 is a flowchart of processing of the charging ECU 40 when a vehicle 10 is on charge.

FIG. 10 is a flowchart of processing of the charging ECU 40 when the vehicle 10 is on charge. The processing in this flowchart is started when charging allowance information and information indicative of a desired value of SOC are supplied from the vehicle ECU 50.

At S1002, the charging control unit 300 determines an SOCobj based on the desired value of SOC acquired from the vehicle ECU 50. The SOCobj is the target SOC, which is a target value of charging. Referring to the above-described SOC-to-voltage chart, the charging control unit 300 calculates a target voltage Vobj corresponding to the SOCobj.

At S1004, the acquisition unit 310 acquires from the battery ECU 30 battery information including a charge current, a stop temperature, a cell voltage, and a temperature of the battery 20. The battery ECU 30 transmits the charging ECU 40 the present cell voltage, temperature, and charge current detected in the battery 20 at intervals of 1 second to 10 seconds, for example. When the battery ECU 30 determines the stop temperature at which to stop the battery 20, the battery ECU 30 transmits the determined stop temperature to the charging ECU 40.

At S1010, the charging control unit 300 determines whether the battery temperature exceeds the stop temperature. As the battery temperature, a maximum temperature Ta of the battery 20 may be applied. When the battery temperature exceeds the stop temperature, charging of the battery 20 is stopped. When the battery temperature does not exceed the stop temperature, the charging control unit 300 at S1012 charges the battery 20 with the charge current acquired from the battery ECU 30 at S1004.

At S1014, the charging control unit 300 determines whether the cell voltage is equal to or higher than the Vobj. As the cell voltage for determination at S1014, a maximum value from among the cell voltages of the plurality of cells 22 that are acquired from the battery ECU 30 may be applied. When the cell voltage is lower than the Vobj, the processing proceeds to S1004.

When the cell voltage is equal to or higher than Vobj, the charging control unit 300 performs constant-voltage charging of the battery 20 at S1020. The charging control unit 300 continues, for a predetermined period of time, the constant-voltage charging with a charge voltage at the time of switching to the constant-voltage charging. As time for the constant-voltage charging, time of approximately 30 minutes may be applied. When the charge current of the constant-voltage charging becomes lower than a predetermined current, the charging control unit 300 may stop the constant-voltage charging. For example, when the charge current becomes equal to or lower than 1.5 A, the constant-voltage charging may be stopped. When an ending condition of the constant-voltage charging is satisfied, the charging control unit 300 stops charging the battery 20 at S1022, and ends the processing of this flowchart.

Figure 11:
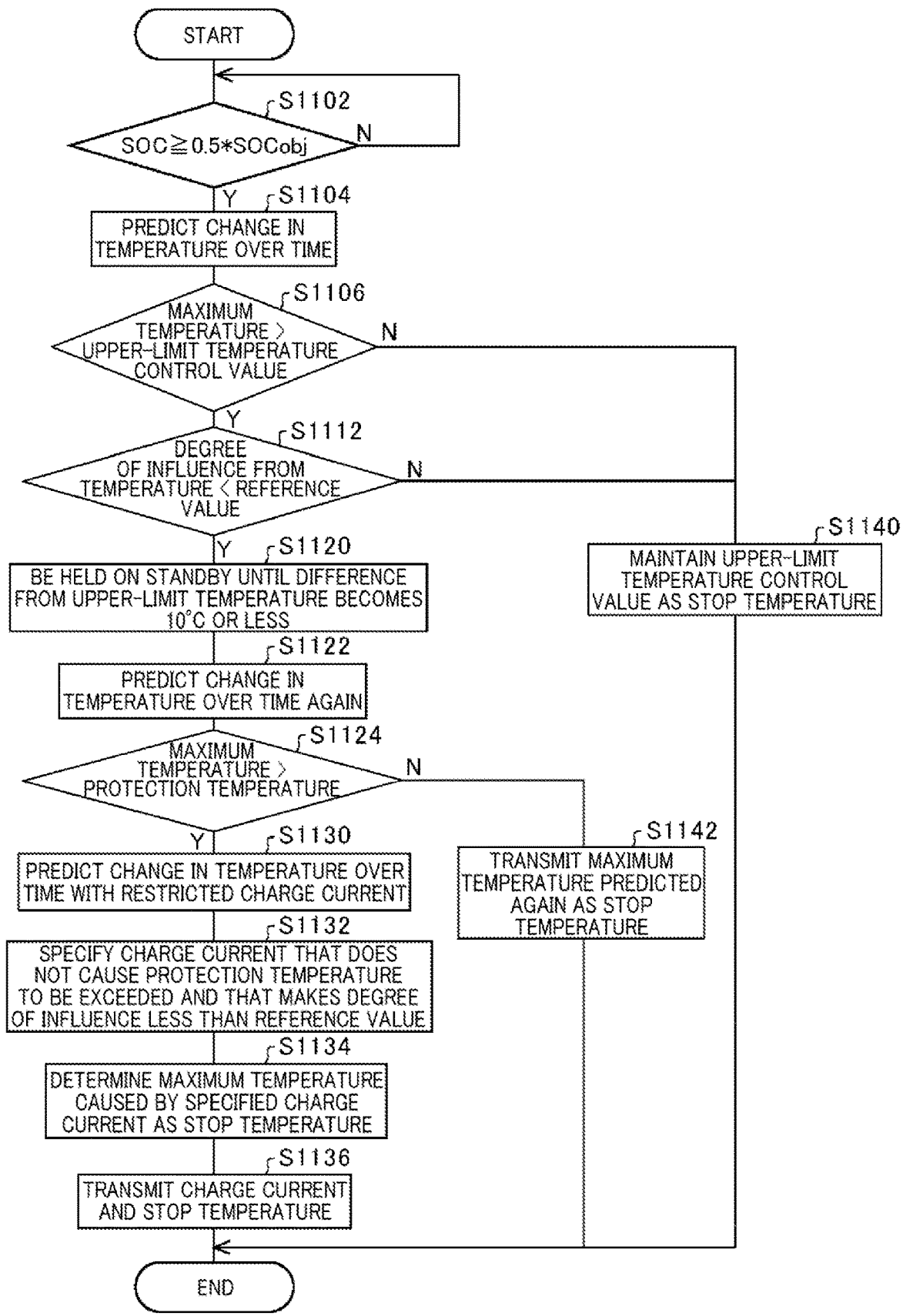
FIG. 11 is a flowchart of processing of the battery ECU 30.

FIG. 11 is a flowchart of processing of the battery ECU 30. The processing of this flowchart is a flowchart of processing for predicting a change in temperature over time and determine a stop temperature. In addition to the processing illustrated in this flowchart, the battery ECU 30 transmits the charging ECU 40 the present cell voltage, current, and temperature detected in the battery 20 at intervals of 1 second to 10 seconds, for example. The battery ECU 30 transmits the charging ECU 40 a charge current prescribed by the charge current map or a restricted charge current. Furthermore, the battery ECU 30 transmits, as the stop temperature, the upper-limit temperature control value T1 determined for the battery 20 or a temperature over the upper-limit temperature control value T1 to the charging ECU 40.

In the flowchart of FIG. 11, at S1102, the prediction unit 220 determines whether the SOC of the battery 20 is equal to or higher than 50% of the SOCobj. When the SOC of the battery 20 is not equal to or higher than 50% of the SOCobj, determination at S1102 is repeated until the SOC of the battery 20 becomes equal to or higher than 50% of the SOCobj. The prediction unit 220 predicts a change in temperature over time at S1104, when the SOC of the battery 20 is equal to or higher than 50% of the SOCobj.

At S1106, the temperature determination unit 240 determines whether the maximum temperature in the change in temperature over time predicted at S1104 exceeds the upper-limit temperature control value T1. When the maximum temperature does not exceed the upper-limit temperature control value T1, it is determined at S1140 that the upper-limit temperature control value T1 is maintained as the stop temperature, and the processing of this flowchart is ended. When the maximum temperature exceeds the upper-limit temperature control value T1, the calculation unit 230 calculates a degree of influence that the battery 20 receives based on the change in temperature over time predicted at S1106 and the above formula 1, and determines whether the degree of influence is less than the reference value. When the degree of influence that the battery 20 receives is equal to or higher than the reference value, the processing proceeds to S1140, and the processing of this flowchart is ended. When the degree of influence that the battery 20 receives is less than the reference value, the processing is held on standby until the difference between the temperature of the battery 20 and the upper-limit temperature control value T1 becomes equal to or less than 10° C.

When the difference between the temperature of the battery 20 and the upper-limit temperature control value T1 becomes equal to or less than 10° C., the prediction unit 220 predicts a change in temperature over time again at S1122. At S1124, the temperature determination unit 240 determines whether the maximum temperature in the change in temperature over time predicted at S1122 exceeds the protection temperature. When the maximum temperature does not exceed the protection temperature, the temperature determination unit 240 determines the maximum temperature as the stop temperature and transmits the determined stop temperature to the charging ECU 40 at 51142, and ends the processing of this flowchart. When the maximum temperature exceeds the protection temperature, the prediction unit 220 sets a plurality of charge currents restricted to current values lower than the charge current prescribed by the charge current map and predicts a change in temperature over time concerning each of the plurality of charge currents at S1130.

At S1132, the current determination unit 200 specifies, based on the change in temperature over time predicted at S1130, charge currents from among the set plurality of charge currents with which the maximum temperature in the change in temperature over time is not to exceed the protection temperature and with which the degree of influence is less than the reference value, and the current determination unit 200 determines the maximum charge current from among the specified charge currents as the charge current of the battery 20. At S1134, the temperature determination unit 240 determines, as the stop temperature, the maximum temperature in the change in temperature over time predicted in the case of charging with the specified charge current. At S1136, the battery ECU 30 transmits the charging ECU 40 the charge current and the stop temperature determined at S1132 and S1134, and ends the processing of this flowchart.

Under the above-described control by the battery ECU 30 and the charging ECU 40, the battery 20 can be allowed to exceed the upper-limit temperature control value T1 and be charged so that charging time of the battery 20 can be shortened. Moreover, a determination is made as to whether to allow charging over the upper-limit temperature control value T1, appropriately considering the degree of influence that the battery 20 receives from being charged over the upper-limit temperature control value T1, so that an influence on cell properties, for example, that the battery 20 receives from exceeding the upper-limit temperature control value T1 can be decreased.

Generally, in the process of charging a battery, the sum total of heat of reaction and Joule's heat increases a battery temperature, and more heat is generated as a charge current increases. In view of this, as a method for charging the battery, a method can be considered in which an upper limit value and a lower limit value of a charging start temperature are fixedly set, and charging is automatically started with a constant current when the battery temperature is within a range between the upper and lower limit values. Moreover, an upper-limit temperature control value at which charging can be performed is set even during charging so as to stop charging when the battery temperature reaches the upper-limit temperature control value in the charging process or when it is obvious from a temperature change rate that the battery temperature is to reach the upper-limit temperature control value. However, in this charging method, charging is ended when the battery temperature reaches the upper-limit temperature control value. Consequently, in the case of a high charging start temperature and a high charge current, the battery temperature reaches the upper-limit temperature control value so early that charging may be ended before reaching a target SOC.

In order to avoid ending the charging before reaching the target SOC as described above, a method can be considered in which a reference value is provided with respect to a temperature in each SOC. When the battery temperature is among the reference values, charging is performed without restricting an output. When the battery temperature exceeds the reference values, the output is restricted, and the output is reduced as the battery temperature increases. This prevents charging time from being lengthened. However, in this method, the output for charging is limited to a maximum output of a charger so that when a charge current of a high rate of approximately 2 C to 8 C is supplied, the temperature increases in a short time. Consequently, it is not easy to apply this method to high-current charging. Moreover, in the case of charging a battery including a large number of cells at a high rate, a cell of a highest temperature in the battery may restrict control, which may hinder charging in a short time. In this case, when the charge current is lowered to prevent the temperature from reaching the upper-limit temperature control value, charging time is lengthened although deviation of the temperature is reduced.

In contrast, under the control by the charging ECU 40 and the vehicle ECU 50, exceeding the upper-limit temperature control value is allowed, appropriately considering an influence in the case of temporarily exceeding the upper-limit temperature control value, which is an upper limit value of temperature that enables continuous operation. Consequently, even in the case of charging at a high rate, maximum energy can be accumulated in a short time while an influence on cell performance of the battery is suppressed.

Figure 12:
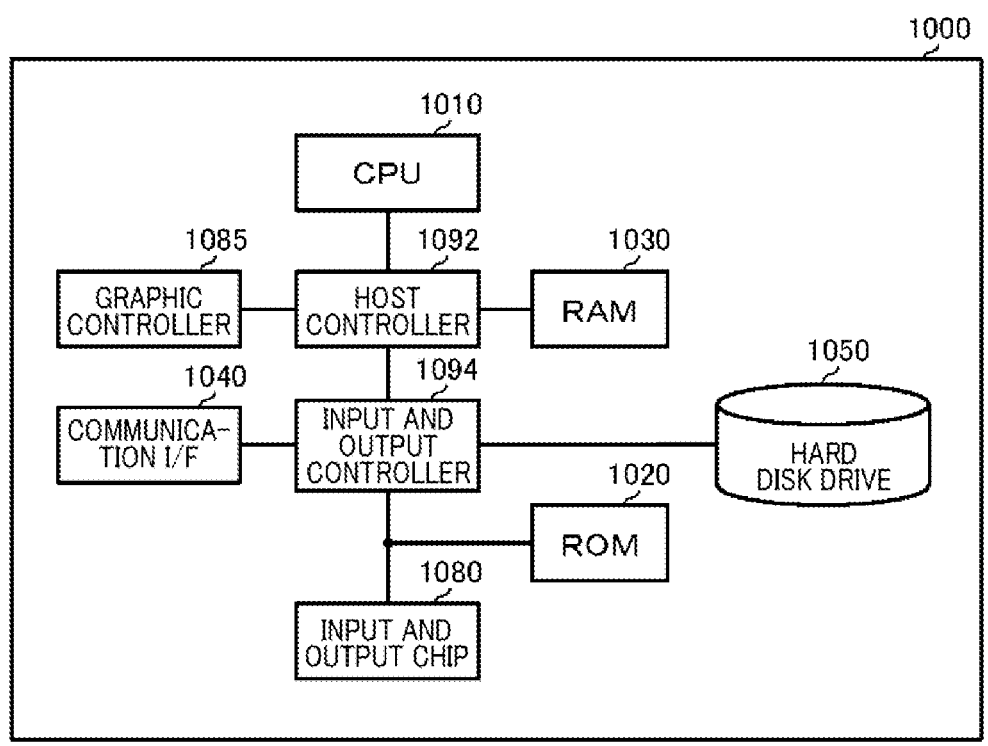
FIG. 12 schematically illustrates an exemplary computer 1000 configured to function as the battery ECU 30 and the charging ECU 40.

FIG. 12 schematically illustrates an exemplary computer 1000 configured to function as the battery ECU 30 and the charging ECU 40. The computer 1000 according to this embodiment consists of a CPU peripheral portion including a CPU 1010, a RAM 1030, and a graphic controller 1085 that are mutually connected by a host controller 1092, and an input and output portion including a ROM 1020, a communication I/F 1040, a hard disk drive 1050, and an input and output chip 1080 that are connected to the host controller 1092 via an input and output controller 1094.

The CPU 1010 operates based on programs stored in the ROM 1020 and the RAM 1030 and controls the components. The graphic controller 1085 acquires and displays image data on a display. The image data is generated on a frame buffer provided in the RAM 1030 by the CPU 1010, for example. In place of this, the graphic controller 1085 may include an internal frame buffer that has stored therein image data generated by the CPU 1010, for example.

The communication I/F 1040 communicates with other devices via a network wired or wireless. Moreover, the communication I/F 1040 functions as hardware for communication. The hard disk drive 1050 has stored thereon programs and data used by the CPU 1010.

The ROM 1020 has stored therein, for example, a boot program executed by the computer 1000 at a startup and programs dependent on hardware of the computer 1000. The input and output chip 1080 connects various kinds of input and output devices to the input and output controller 1094 via, for example, a parallel port, a serial port, a keyboard port, and a mouse port.

Programs provided for the hard disk drive 1050 via the RAM 1030 are stored on a recording medium such as an IC card and provided by a user. The programs are read from the recording medium, installed in the hard disk drive 1050 via the RAM 1030, and executed by the CPU 1010.

Programs installed in the computer 1000 to cause the computer 1000 to function as the battery ECU 30 may operate the CPU 1010, for example, to make the computer 1000 function as each component of the battery ECU 30 including the acquisition unit 210, the prediction unit 220, the calculation unit 230, the current determination unit 200, the temperature determination unit 240, and the storage unit 280. Information processing written in these programs is read by the computer 1000 to cause software and various kinds of hardware resources described above to function as specific means for cooperating with each other. Such specific means implements calculation or processing of information in accordance with a purpose of use of the computer 1000 in this embodiment so as to constitute the battery ECU 30 peculiar to the purpose of use.

Similarly, programs installed in the computer 1000 to cause the computer 1000 to function as the charging ECU 40 may operate the CPU 1010, for example, to make the computer 1000 function as each component of the charging ECU 40 including the acquisition unit 310, the charging control unit 300, and the storage unit 380. Information processing written in these programs is read by the computer 1000 to cause software and various kinds of hardware resources described above to function as specific means for cooperating with each other. Such specific means implements calculation or processing of information in accordance with a purpose of use of the computer 1000 in this embodiment so as to constitute the charging ECU 40 peculiar to the purpose of use.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

5: charging system
8: charging apparatus
9: charging connector
10: vehicle
12: drive wheel
14: motor unit
18: power receiver
20: battery
21: battery pack
22: cell
24: temperature sensor
26: current sensor
28: cooling device
30: battery ECU
40: charging ECU
50: vehicle ECU
70: PCU
80: convertor 200: current determination unit
210: acquisition unit
220: prediction unit
230: calculation unit
240: temperature determination unit
280: storage unit
290: processor
300: charging control unit
310: acquisition unit
380: storage unit
390: processor
700, 800, 810, 820, 900, 901, 910, 911: line
1000: computer
1010: CPU
1020: ROM
1030: RAM
1040: communication I/F
1050: hard disk drive
1080: input and output chip
1085: graphic controller
1092: host computer
1094: input and output controller

What is claimed is:

1. A charging control apparatus comprising:
a prediction unit configured to predict a change in temperature of a battery over time during charging;
a calculation unit configured to calculate, based on the change in temperature over time predicted by the prediction unit, a degree of influence that the battery receives from the temperature of the battery exceeding a predetermined upper-limit temperature control value; and
a charging control unit configured to, when the degree of influence is less than a predetermined reference value, allow the temperature of the battery to exceed the upper-limit temperature control value, and charge the battery, wherein
the charging control unit is configured to, when the degree of influence calculated by the calculation unit does not exceed the predetermined reference value, restrict a charge amount of the battery so as to hinder the predicted temperature of the battery from exceeding a predetermined protection temperature higher than the upper-limit temperature control value.

2. The charging control apparatus according to claim 1, wherein the prediction unit is configured to predict, concerning each of a plurality of charge currents, a change in temperature of the battery over time in a case of charging the battery with each of the charge currents,
the charging control apparatus further comprising a current determination unit configured to specify, from among the plurality of charge currents, charge currents that do not cause a maximum temperature in the change in temperature over time to exceed the predetermined protection temperature, and configured to determine a maximum charge current from among the specified charge currents as a charge current of the battery, and
wherein the charging control unit is configured to charge the battery with the charge current determined by the current determination unit.

3. The charging control apparatus according to claim 2, wherein the prediction unit is configured to predict, concerning each of the plurality of charge currents, a change in temperature of the battery over time in a case of stopping charging of the battery when the charge rate of the battery reaches a target charge rate, considering an amount of heat generated by the battery and a charge rate of the battery that are predicted in a case of charging the battery with each of the charge currents and considering an amount of heat of the battery cooled per unit time.

4. The charging control apparatus according to claim 3, wherein the prediction unit is configured to predict the amount of generated heat, concerning each of the plurality of charge currents, considering an internal resistance in accordance with a temperature of the battery that is predicted in a case of charging the battery with each of the charge currents.

5. The charging control apparatus according to claim 2, wherein the charging control unit is configured to stop charging the battery when, after starting to charge the battery with the maximum charge current, the temperature of the battery reaches the maximum temperature in the change in temperature of the battery over time that is predicted in relation to the maximum charge current by the prediction unit.

6. The charging control apparatus according to claim 2, wherein the prediction unit is configured to predict, based on a present state of charge and a present temperature of the battery and a charge current map configured to prescribe a charge current using a temperature of the battery and a state of charge of the battery as indices, a future change in temperature of the battery over time in a case of charging the battery in accordance with the charge current map.

7. The charging control apparatus according to claim 1, wherein the calculation unit is configured to calculate the degree of influence, when a charge rate of the battery is equal to or higher than 50% of a target value of the charge rate.

8. A transport device comprising the charging control apparatus according to claim 1.

9. A non-temporary computer-readable storage medium having stored thereon a program configured to cause a computer to function as:
a prediction unit configured to predict a change in temperature of a battery over time during charging;
a calculation unit configured to calculate, based on the change in temperature over time predicted by the prediction unit, a degree of influence that the battery receives from the temperature of the battery exceeding a predetermined upper-limit temperature control value; and
a charging control unit configured to allow the temperature of the battery to exceed the upper-limit temperature control value, and charge the battery, when the degree of influence is less than a predetermined reference value, wherein
the charging control unit is configured to, when the degree of influence calculated by the calculation unit does not exceed the predetermined reference value, restrict a charge amount of the battery so as to hinder the predicted temperature of the battery from exceeding a predetermined protection temperature higher than the upper-limit temperature control value.

* * * * *